（12）United States Patent
Chang (10) Patent No.: US 7,553,058 B2
(45) Date of Patent: Jun. 30, 2009

(54) OPTICAL PLATE AND METHOD FOR MANUFACTURING SAME AND BACKLIGHT MODULE USING SAME

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/565,565

(22) Filed: Nov. 30, 2006

(65) Prior Publication Data

US 2008/0030994 A1 Feb. 7, 2008

(30) Foreign Application Priority Data

Aug. 4, 2006 (CN) .................. 2006 1 0061989

(51) Int. Cl.
  *F21V 3/04* (2006.01)
(52) U.S. Cl. .................. 362/607; 362/29; 362/330
(58) Field of Classification Search ............ 362/29, 362/30, 330, 333, 606, 607, 612, 613, 614, 362/627; 359/599
  See application file for complete search history.

(56) References Cited

U.S. PATENT DOCUMENTS

| 5,971,559 | A | 10/1999 | Ishikawa et al. |
| 6,913,365 | B2* | 7/2005 | Masaki et al. ............... 362/627 |
| 6,979,112 | B2 | 12/2005 | Yu et al. |
| 7,255,456 | B2* | 8/2007 | Yao et al. ................... 362/330 |
| 7,255,462 | B2 | 8/2007 | Tseng |
| 2006/0001793 | A1 | 1/2006 | Nitto et al. |
| 2006/0109682 | A1* | 5/2006 | Ko et al. ..................... 362/607 |
| 2007/0171671 | A1* | 7/2007 | Kurokawa et al. .......... 362/606 |
| 2007/0263412 | A1* | 11/2007 | Lee ............................ 362/627 |
| 2007/0285785 | A1* | 12/2007 | Lin ............................. 359/599 |
| 2008/0030860 | A1* | 2/2008 | Chang ........................ 359/599 |
| 2008/0037274 | A1 | 2/2008 | Chang |
| 2008/0037281 | A1 | 2/2008 | Chang |
| 2008/0043455 | A1 | 2/2008 | Chang |
| 2008/0043493 | A1 | 2/2008 | Chang |

FOREIGN PATENT DOCUMENTS

| CN | 1779522 | 5/2006 |
| JP | 11-38207 | 2/1999 |
| WO | 2006022270 | 3/2006 |

\* cited by examiner

*Primary Examiner*—Y My Quach Lee
(74) *Attorney, Agent, or Firm*—Steven M. Reiss (57) ABSTRACT

An exemplary optical plate (23) includes a transparent plate portion 231, a plurality of brightness enhancement structures (232) and a light diffusion layer (233). The transparent plate portion has a light input interface (2311), and a light output surface (2312) opposite to the light input interface. The brightness enhancement structures are formed at the light output surface. The light diffusion layer are formed on the light input interface, which includes a transparent resin matrix material and a plurality of first light diffusion particles and a plurality of second light diffusion particles dispersed in the transparent resin matrix material uniformly. A refractive index of the second light diffusion particles is greater than that of the first light diffusion particles. An exemplary method for manufacturing the optical plate is also provided. The optical plate and an associated backlight module (20) can increase the light energy utilization ratio.

16 Claims, 7 Drawing Sheets

OPTICAL PLATE AND METHOD FOR MANUFACTURING SAME AND BACKLIGHT MODULE USING SAME

This application is one of five co-pending U.S. patent applications, which are: application Ser. No. 11/550,379, filed on Oct. 17, 2006, and entitled "OPTICAL PLATE AND BACKLIGHT MODULE USING THE SAME"; application Ser. No. 11/557,914, filed on Nov. 08, 2006, and entitled "OPTICAL PLATE AND BACKLIGHT MODULE USING THE SAME"; application Ser. No. 11/565,565, filed on Nov. 30, 2006, and entitled "OPTICAL PLATE AND METHOD FOR MANUFACTURING SAME AND BACKLIGHT MODULE USING SAME"; application Ser. No. 11/565,575, filed on Nov. 30, 2006, and entitled "OPTICAL PLATE WITH DIFFUSION LAYER AND BACKLIGHT MODULE USING THE SAME"; application Ser. No. 11/566,836, filed on Dec. 05, 2006, and entitled "OPTICAL PLATE WITH DIFFUSION LAYER AND BACKLIGHT MODULE USING THE SAME". In the co-pending applications, the inventors are Shao-Han Chang. The co-pending applications have the same assignee as the present application. The disclosure of the above identified applications is incorporated herein by reference.

BACKGROUND OF THE INVENTION

1. Field of the Invention

The present invention relates to an optical plate, a method for manufacturing the optical plate, and a backlight module using the optical plate, the backlight module typically being used in apparatuses such as a liquid crystal display (LCD).

2. Discussion of the Related Art

In a liquid crystal display, liquid crystal is a substance that does not itself radiate light. Instead, the liquid crystal relies on light received from a light source, in order that the liquid crystal can provide displaying of images and data. In the case of a typical liquid crystal display device, a backlight module powered by electricity supplies the needed light.

Figure 1:
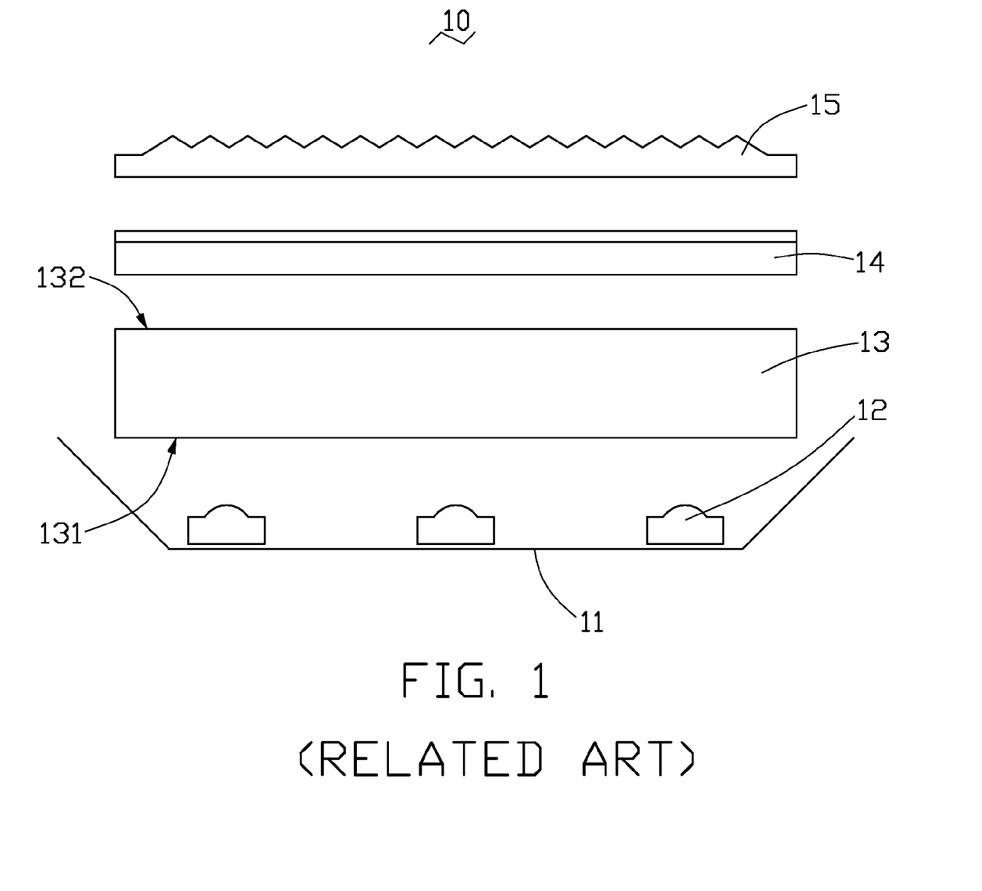
FIG. 1 is an exploded, side cross-sectional view of a conventional backlight module.

Referring to FIG. 1, a typical direct type backlight module 10 is shown. The backlight module 10 includes a reflecting sheet 11, a plurality of light sources 12, a light diffusion plate 13, a light diffusion sheet 14, and a prism sheet 15. The light diffusion plate 13 is used for diffusing light rays from the light sources 12, and may have a multiplicity of light diffusion particles dispersed therein. The light diffusion plate 13 includes a light input surface 131 facing the light sources 12, and a light output surface 132 opposite to the light input surface 131. The reflecting sheet 11 is positioned under the light sources 12, and is configured for reflecting light rays back into the light diffusion plate 13. The light diffusion sheet 14 faces the light output surface 132 of the light diffusion plate 13, and is used for further diffusing light rays received from the light diffusion plate 13. The prism sheet 15 is positioned above the diffusion sheet 14. The prism sheet 15 is configured for collimating light rays emitted from the light diffusion sheet 14, thereby improving the brightness of light illumination provided by the backlight module 10.

Generally, the light diffusion plate 13, the light diffusion sheet 14, and the prism sheet 15 are in contact with each other, but with a plurality of air pockets existing at interfaces therebetween. In use of the backlight module 10, light rays pass through the air pockets, and some of the light rays undergo reflection at one or another of the corresponding boundaries of the interfaces. Thus the light energy utilization ratio of the backlight module 10 is reduced.

Therefore, what is needed is a new optical plate that has an improved light energy utilization ratio. What is also needed is a method for manufacturing such optical plate. What is further needed is a backlight module using such optical plate.

SUMMARY

In one aspect, an optical plate according to a preferred embodiment includes a transparent plate portion, a plurality of brightness enhancement structures and a light diffusion layer. The transparent plate portion includes a light input interface, a light output surface opposite to the light input interface. The brightness enhancement structures are formed at the light output surface. The light diffusion layer is formed on the light input interface. The light diffusion layer includes a transparent resin matrix material and a plurality of first light diffusion particles and a plurality of second light diffusion particles dispersed in the transparent resin matrix material uniformly. A refractive index of the second light diffusion particles is greater than that of the first light diffusion particles.

In another aspect, a method for manufacturing an optical plate according to a preferred embodiment includes: providing a transparent plate member having a light input interface, a light output surface opposite to the light input interface, and a plurality of brightness enhancement structures formed at the light output surface; providing a diffusion composition, which includes a resin and a plurality of first light diffusion particles and a plurality of second light diffusion particles dispersed in the resin uniformly, wherein a refractive index of the second light diffusion particles is greater than that of the first light diffusion particles; applying the diffusion composition on the light input interface; and curing the diffusion composition, thereby forming a light diffusion layer on the transparent plate member.

In still another aspect, a backlight module according to a preferred embodiment includes a light source and an optical plate adjacent the light source. The optical plate includes a transparent plate portion, a plurality of brightness enhancement structures and a light diffusion layer. The transparent plate portion includes a light input interface nearest to the light source and a light output surface opposite to the light input interface. The brightness enhancement structures are formed at the light output surface. The light diffusion layer is formed on the light input interface. The light diffusion layer includes a transparent resin matrix material and a plurality of first light diffusion particles and a plurality of second light diffusion particles each dispersed in the transparent resin matrix material uniformly. A refractive index of the second light diffusion particles is greater than that of the first light diffusion particles.

Other advantages and novel features will become more apparent from the following detailed description of various embodiments when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate, method, and backlight module. Moreover, in the drawings, like reference numerals designate corresponding parts throughout the several views, and all the views are schematic.

DETAILED DESCRIPTION OF THE PREFERRED EMBODIMENTS

Reference will now be made to the drawings to describe preferred embodiments of the present optical plate, method for manufacturing the optical plate, and backlight module using the optical plate, in detail.

Figure 2:
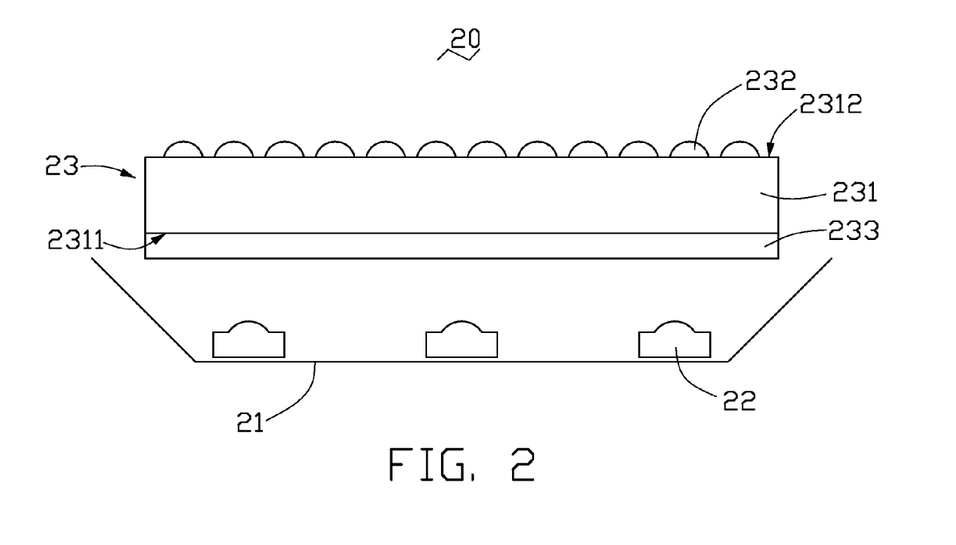
FIG. 2 is a side cross-sectional view of a backlight module according to a first preferred embodiment of the present invention.
Figure 3:
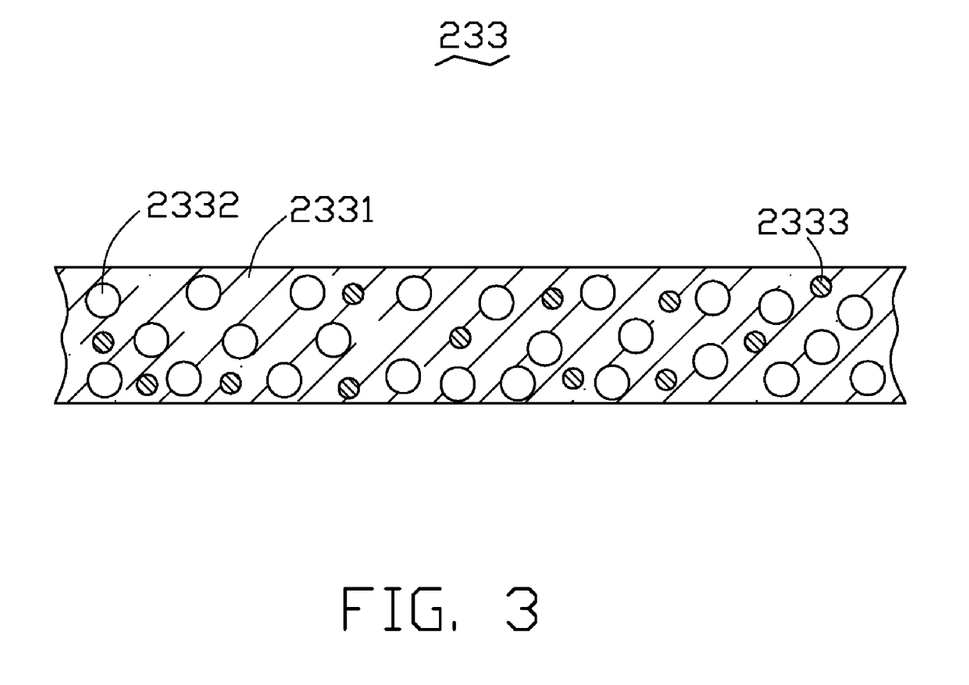
FIG. 3 is an enlarged view of part of a light diffusion layer of an optical plate of the backlight module of FIG. 2.

Referring to FIG. 2, a backlight module 20 according to a first preferred embodiment of the present invention is shown. The backlight module 20 includes a reflecting sheet 21, a plurality of light sources 22, and an optical plate 23. The light sources 22 are located between the reflecting sheet 21 and the optical plate 23. The optical plate 23 includes a transparent plate portion 231, a plurality of brightness enhancement structures 232 formed on the transparent plate portion 231, and a light diffusion layer 233 under the transparent plate portion 231. The transparent plate portion 231 has a light input interface 2311 nearest to the light sources 22, and a light output surface 2312 opposite to the light input interface 2311. The brightness enhancement structures 232 are formed at the light output surface 2312. The light diffusion layer 233 is formed on the light input interface 2311. In particular, the light diffusion layer 233 can be applied by way of coating on the light input interface 2311 (see below), whereby no air pockets exist between the light input interface 2311 and the light diffusion layer 233. Referring also to FIG. 3, the light diffusion layer 233 is made of a transparent resin matrix material 2331, and a plurality of first and second light diffusion particles 2332, 2333 each dispersed in the transparent resin matrix material 2331 uniformly. A refractive index of the second light diffusion particles 2333 is greater than that of the first light diffusion particles 2332. The light sources 22 can be light emitting diodes or cold cathode fluorescent lamps.

A material of the transparent plate portion 231 can be selected from the group consisting of polycarbonate, polymethyl methacrylate, polystyrene, methyl methacrylate styrene copolymer, and any suitable combination thereof. A thickness of the transparent plate portion 231 is in the range from about 1.0 millimeter to about 6.0 millimeters, and is preferably in the range from about 1.5 millimeters to about 3.0 millimeters.

The light diffusion layer 233 is used for uniformly diffusing light rays emitted from the light sources 22. A thickness of the light diffusion layer 233 is preferably no more than 15 percent of the thickness of the transparent plate portion 231. The light diffusion layer 233 typically includes the transparent resin matrix material 2331 in an amount of from 5% to 90% by weight of the light diffusion layer 233, and the first and second light diffusion particles 2332, 2333 in a combined amount of from 10% to 95% by weight of the light diffusion layer 233. A ratio by weight of the first light diffusion particles 2332 to the second light diffusion particles 2333 is typically in the range from 5:1 to 100:1.

The transparent resin matrix material 2331 can be selected from the group consisting of acrylic resin, acrylic amino resin, epoxy resin, and any suitable combination thereof. The refractive index of the first light diffusion particles 2332 is typically in the range from about 1.4 to about 1.7. The refractive index of the second light diffusion particles 2333 is typically greater than 2.0, and is preferably in the range from about 2.0 to about 2.8. The first light diffusion particles 2332 can be selected from the group consisting of polystyrene particles, polycarbonate particles, styrene acrylonitrile copolymer particles, polypropylene particles, polymethyl methacrylate particles, glass beads, silicon dioxide particles, quartz particles, and any combination thereof. The second light diffusion particles 2333 can be selected from the group consisting of titanium dioxide particles, barium sulfate particles, zinc sulfide particles, zinc oxide particles, antimony oxide particles, calcium carbonate particles, and any combination thereof. In addition, an average size of the first light diffusion particles 2332 is preferably larger than that of the second light diffusion particles 2333. As an example, the average size of the first light diffusion particles 2332 can be in the range from about 1 micrometer to about 50 micrometers, and the average size of the second light diffusion particles 2333 can be in the range from about 0.01 micrometers to about 1 micrometer.

When light rays enter the light diffusion layer 233, the first light diffusion particles 2332 can diffuse the light rays substantially before the second light diffusion particles 2333. The second light diffusion particles 2333 can further diffract and reflect the light rays, due to their smaller sizes and greater refractive index relative to the first light diffusion particles 2332. Thus the light diffusion layer 233 has good light diffusion capability with the cooperative effects of the first light diffusion particles 2332 and the second light diffusion particles 2333.

Figure 4:
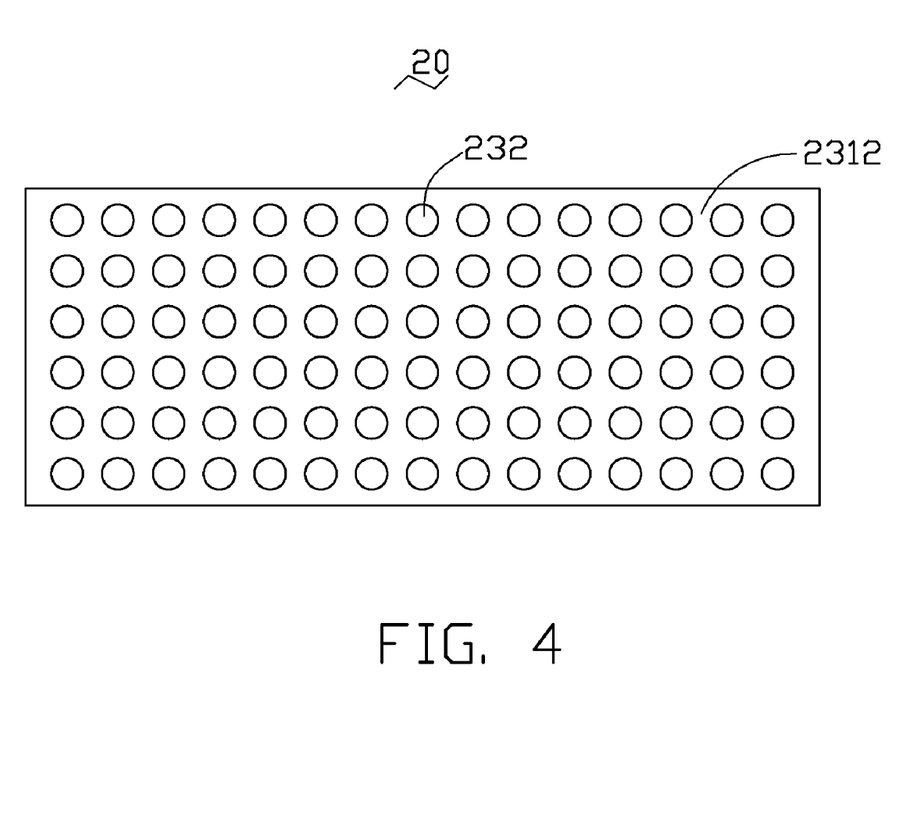
FIG. 4 is a top plan view of the optical plate of the backlight module of FIG. 2, showing an array of brightness enhancement structures thereof.

The brightness enhancement structures 232 can be selected from the group consisting of hemispherical protrusions, hemispherical concavities, sub-hemispherical protrusions, sub-hemispherical concavities, V-shaped protrusions, V-shaped grooves, arc-shaped protrusions, and arc-shaped grooves. Also referring to FIG. 4, in the first embodiment, the brightness enhancement structures 232 are hemispherical protrusions. The brightness enhancement structures 232 are arranged separately from each other in a regular matrix on the light output surface 2312. A diameter of each brightness enhancement structure 232 is in the range from about 10 micrometers to about 500 micrometers. A minimum distance between two brightness enhancement structures 232 is no more than about 100 micrometers.

When the backlight module 20 is in use, the light rays from the light sources 22 enter the optical plate 23. The light rays are diffused in the light diffusion layer 233 uniformly. Many or most of the light rays are condensed by the brightness enhancement structures 232 of the optical plate 23 before they exit the light output surface 2312. As a result, the optical plate 23 can replace a light diffusion plate, a light diffusion sheet and a prism sheet that are ordinarily used in a conventional backlight module. Thus, air pockets that would ordinarily exist in a conventional backlight module are eliminated. In particular, light rays do not pass through air pockets in the optical plate 23, and thus a loss of light energy in the backlight module 20 is reduced. In addition, the backlight module 20 can have a reduced thickness, because the present optical plate 23 is typically thinner than the combined thickness of a conventional light diffusion plate, light diffusion sheet, and prism sheet.

In order to further increase the light energy utilization ratio of the backlight module 20, the light diffusion layer 233 may further include a plurality of fluorescent particles (not shown). A ratio by weight of the fluorescent particles to the first light diffusion particles 2332 is typically less than 1:100. The fluorescent particles convert ultraviolet (UV) light into visible light. Thus the light energy utilization ratio of the backlight module 20 may be enhanced further. Moreover, changes in the color of the optical plate 23 due to the long-term effects of exposure to ultraviolet (UV) light can be avoided.

Figure 5:
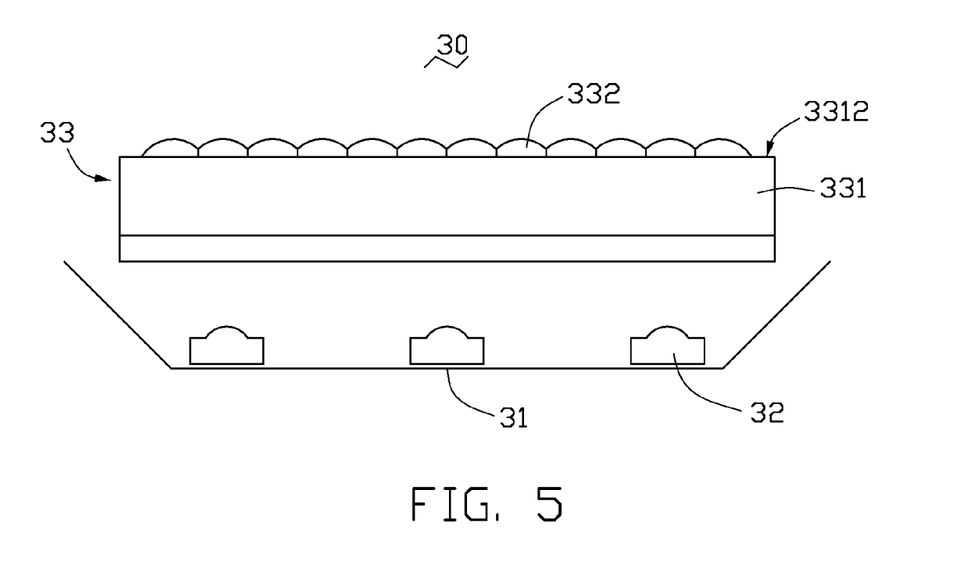
FIG. 5 is a side cross-sectional view of a backlight module according to a second preferred embodiment of the present invention.
Figure 6:
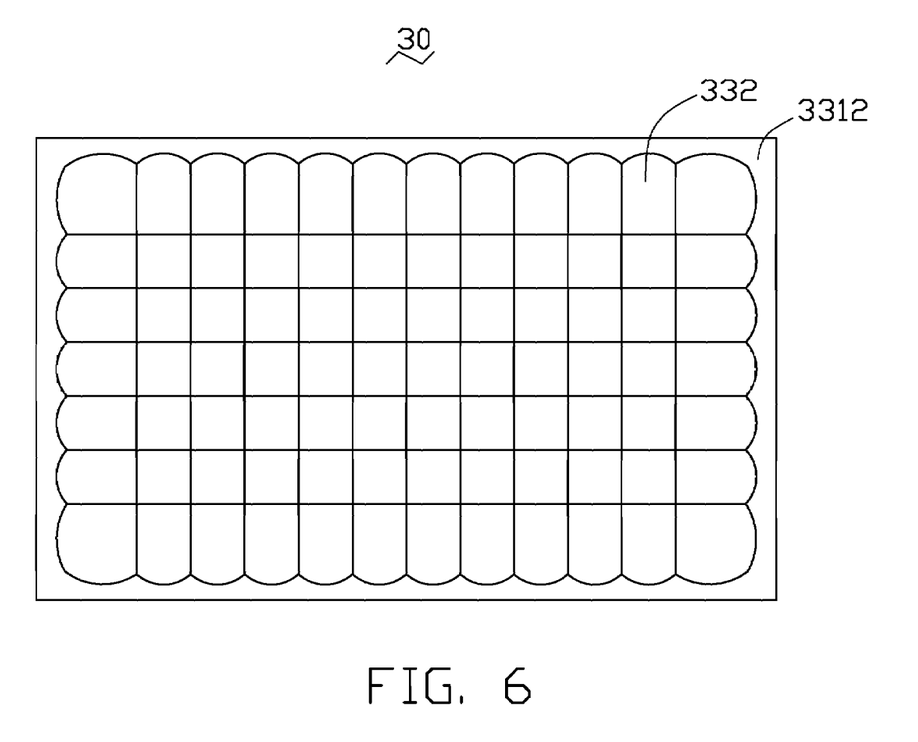
FIG. 6 is a top plan view of an optical plate of the backlight module of FIG. 5, showing an array of brightness enhancement structures thereof.

Referring to FIGS. 5 and 6, a backlight module 30 according to a second preferred embodiment of the present invention is shown. The backlight module 30 is similar in principle to the backlight module 20 of the first embodiment. The backlight module 30 includes a reflecting sheet 31, a plurality of light sources 32, and an optical plate 33. The brightness enhancement structures 332 of the optical plate 33 are all interconnected with one another to form a regular microstructure pattern. The brightness enhancement structures 332 essentially cover an entire light output surface 3312 of a transparent plate portion 331 of the optical plate 33. Therefore almost all light rays that enter the transparent plate portion 331 pass through the brightness enhancement structures 332 before they exit the optical plate 331. Accordingly, a brightness of the backlight module 30 is enhanced.

An exemplary method for manufacturing the optical plate 23 is described in detail below.

Firstly, the transparent plate portion 231 is provided. The transparent plate portion 231 has the light input interface 2311, the light output surface 2312 opposite to the light input interface 2311, and the plurality of brightness enhancement structures 232 formed on the light output surface 2312. The brightness enhancement structures 232 can be formed by etching, or can be integrally manufactured with the transparent plate portion 231 by injection molding.

Secondly, a diffusion composition is provided. The diffusion composition includes a resin, and a plurality of the first and second light diffusion particles 2332, 2333 each dispersed in the resin uniformly. A refractive index of the second light diffusion particles 2333 is greater than that of the first light diffusion particles 2332. In this step, the resin can be molten or dissolved in a solvent beforehand. Then the first and second light diffusion particles 2332, 2333 are fed into the resin and mixed uniformly in the resin.

Thirdly, the transparent plate portion 231 is inverted, and the diffusion composition is applied on the light input interface 2311 of the transparent plate portion 231. The applying is performed by, for example, blade coating. In order to increase yield in mass manufacturing, a plurality of rims can be configured on the transparent plate portion 231 at a periphery of the light input interface 2311. The rims can limit a thickness of the diffusion composition applied on the light input interface 2311.

Finally, the diffusion composition is cured. The curing is performed by, for example, light curing or heat curing. The light curing can, for example, be ultraviolet (UV) light curing. Thereby, the light diffusion layer 233 is formed on the light input interface 2311 of the transparent plate portion 231.

Figure 7:
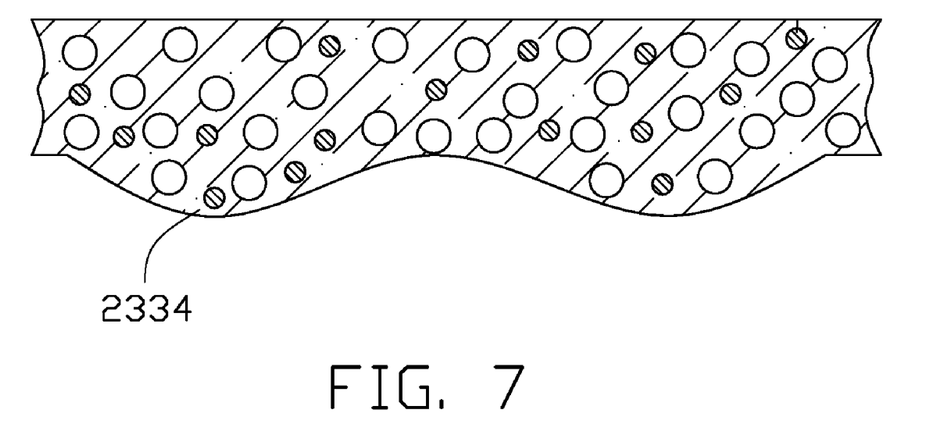
FIG. 7 is similar to FIG. 3, but showing an alternative embodiment in which one of surfaces of the light diffusion layer includes a plurality of protrusions.

It is to be noted that the scope of the present optical plate, backlight module, and method for manufacturing the optical plate is not limited to the above-described embodiments. For example, referring to FIG. 7, the light diffusion layer 233 of the optical plate 23 may further include a plurality of protrusions 2334 on a surface thereof distal from the transparent plate portion 231. The plurality of protrusions 2334 can correspond in number and/or position to the plurality of light sources 22. The protrusions 2334 can enhance the light diffusion capability of the optical plate 23. In another example, the light diffusion layer 233 can be formed by injection molding.

Further, while particular embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An optical plate comprising:
   a transparent plate portion, the transparent plate portion comprising a light input interface, a light output surface opposite to the light input interface, and a plurality of brightness enhancement structures formed at the light output surface; and
   a light diffusion layer formed on the light input interface, the light diffusion layer comprising a transparent resin matrix material, a plurality of first light diffusion particles, a plurality of second light diffusion particles, and a plurality of fluorescent particles dispersed in the transparent resin matrix material uniformly, wherein a refractive index of the second light diffusion particles is greater than that of the first light diffusion particles, a ratio by weight of the first light diffusion particles to fluorescent particles is greater than about 100:1.

2. The optical plate according to claim 1, wherein a material of the transparent plate portion is selected from the group consisting of polycarbornate, polymethyl methacrylate, polystyrene, methyl methacrylate, styrene copolymer, and any combination thereof.

3. The optical plate according to claim 1, wherein a thickness of the transparent plate portion is in the range from about 1.0 millimeter to about 6.0 millimeters.

4. The optical plate according to claim 1, wherein the brightness enhancement structures are selected from the group consisting of hemispherical protrusions, hemispherical concavities, sub-hemispherical protrusions, sub-hemispherical concavities, V-shaped protrusions, V-shaped grooves, arc-shaped protrusions, and arc-shaped grooves.

5. The optical plate according to claim 1, wherein the light diffusion layer comprises transparent resin matrix material in an amount of from 5% to 90% by weight of the light diffusion layer, and the first and second light diffusion particles in a combined amount of from 10% to 95% by weight of the light diffusion layer.

6. The optical plate according to claim 5, wherein a ratio by weight of the first light diffusion particles to the second light diffusion particles is in the range from 5:1 to 100:1.

7. The optical plate according to claim 1, wherein the transparent resin matrix material is selected from the group consisting of acrylic resin, acrylic amino resin, epoxy resin, and any combination thereof.

8. The optical plate according to claim 1, wherein the refractive index of the first light diffusion particles is in the range from about 1.4 to about 1.7, and the refractive index of the second light diffusion particles is greater than 2.0.

9. The optical plate according to claim 1, wherein the first light diffusion particles are selected from the group consisting of polystyrene particles, polycarbonate particles, styrene acrylonitrile copolymer particles, polypropylene particles, polymethyl methacrylate particles, glass beads, silicon dioxide particles, quartz particles, and any combination thereof.

10. The optical plate according to claim 1, wherein the second light diffusion particles are selected from the group consisting of titanium dioxide particles, barium sulfate particles, zinc sulfide particles, zinc oxide particles, antimony oxide particles, calcium carbonate particles, and any combination thereof.

11. The optical plate according to claim 1, wherein the light diffusion layer comprises a surface distal from the transparent plate portion, and a plurality of protrusions formed at the distal surface.

12. A method for manufacturing an optical plate, comprising:

providing a transparent plate member having a light input interface, a light output surface opposite to the light input interface, and a plurality of brightness enhancement structures formed at the light output surface;

providing a diffusion composition, which comprises a resin, a plurality of first light diffusion particles, a plurality of second light diffusion particles, and a plurality of fluorescent particles dispersed in the resin uniformly, wherein a refractive index of the second light diffusion particles is greater than that of the first light diffusion particles, a ratio by weight of the first light diffusion particles to the fluorescent particles is greater than about 100:1;

applying the diffusion composition on the light input interface; and curing the diffusion composition, thereby forming a light diffusion layer on the transparent plate member.

13. The method according to claim 12, wherein the brightness enhancement structures are fabricated by one of etching and injection molding.

14. The method according to claim 12, wherein curing the diffusion composition is performed by one of ultraviolet (UV) curing and heat curing.

15. A backlight module comprising:

a light source; and an optical plate adjacent the light source, the optical plate comprising:

a transparent plate portion, the transparent plate portion comprising a light input interface nearest to the light source and a light output surface opposite to the light input interface, and a plurality of brightness enhancement structures formed at the light output surface; and a light diffusion layer formed on the light input interface, the light diffusion layer comprising a transparent resin matrix material, a plurality of first light diffusion particles, a plurality of second light diffusion particles, and a plurality of fluorescent particles dispersed in the transparent resin matrix material uniformly, wherein a refractive index of the second light diffusion particles is greater than that of the first light diffusion particles, a ratio by weight of the first light diffusion particles to the fluorescent particles is greater than about 100:1.

16. The backlight module according to claim 15, wherein the light source is one of at least one light emitting diode and at least one cold cathode fluorescent lamp.

* * * * *